(12) United States Patent  
Mai

(10) Patent No.: US 7,018,086 B2
(45) Date of Patent: Mar. 28, 2006

(54) BACK LIGHT MODULE AND LIQUID CRYSTAL DISPLAY

(75) Inventor: Che-Kuei Mai, Hsinchu (TW)

(73) Assignee: Toppoly Optoelectronics Corp., Miao-Li (TW)

( * ) Notice: Subject to any disclaimer, the term of this patent is extended or adjusted under 35 U.S.C. 154(b) by 146 days.

(21) Appl. No.: 10/250,212

(22) Filed: Jun. 13, 2003

(65) Prior Publication Data

US 2004/0252479 A1    Dec. 16, 2004

(51) Int. Cl.
*F21V 7/04*    (2006.01)
*H01J 1/62*    (2006.01)

(52) U.S. Cl. .......................... 362/613; 362/29; 362/84; 313/504

(58) Field of Classification Search ................... 362/31, 362/29, 221–225, 330; 313/504–505; 349/68–69
See application file for complete search history.

(56) References Cited

U.S. PATENT DOCUMENTS

| | | | |
|---|---|---|---|
| 6,357,904 B1 * | 3/2002 | Kawashima | 362/555 |
| 6,468,676 B1 * | 10/2002 | Ueda et al. | 428/690 |
| 6,566,805 B1 * | 5/2003 | Tsai et al. | 313/504 |
| 6,582,091 B1 * | 6/2003 | Funamoto et al. | 362/31 |
| 6,796,668 B1 * | 9/2004 | Parker et al. | 362/27 |

* cited by examiner

*Primary Examiner*—Ali Alavi
(74) *Attorney, Agent, or Firm*—Jiang Chyun IP Office

(57) ABSTRACT

A back light module is provided. The back light module comprises a light-guiding plate, a side light source and a bottom light source. The side light source is positioned on one side facing a side surface of the light-guiding plate. The bottom light source is positioned on a bottom surface of the light-guiding plate. Light from the side light source and the bottom light source both emerge from a top surface of the light-guiding plate. The side light source and the bottom light source together provide a bright surface light source that illuminates a liquid crystal display to produce a better display effect. In addition, this invention also provides e liquid crystal display comprising a transmissive or transflective liquid crystal display panel and the aforementioned back light module.

18 Claims, 2 Drawing Sheets

BACK LIGHT MODULE AND LIQUID CRYSTAL DISPLAY

BACKGROUND OF INVENTION

1. Field of Invention

The present invention relates to a back light module and a liquid crystal display. More particularly, the present invention relates to a back light module that provides a surface light source with a high brightness level to illuminate a liquid crystal display.

2. Description of Related Art

With the rapid advance in semiconductor technologies and man-machine interface designs, multi-media are at the forefront of communication. In a multi-media world, displays are an important device. Although cathode ray tube (CRT) is economical to produce and has advantages in many aspects, possible production of hazardous radiation, a bulky body and enormous power consumption are three major factors that diminish its desirableness in a multi-terminal desktop environment. With a better resolution, space utilization and power consumption, liquid crystal display (LCD) has been developed to serve as a substitute for the CRT.

FIG. 1 is a schematic cross-sectional view of a conventional liquid crystal display. As shown in FIG. 1, the liquid crystal display 100 mainly comprises a liquid crystal panel 110 and a back light module 120. The back light module 120 is assembled to the backside of the liquid crystal panel 110. The back light module 120 furthermore comprises a light-guiding plate 122, a side light source 124, a reflective holder 126 and a frame 128.

The light-guiding plate 122 is a wedge-shaped panel with a top surface 130, a bottom surface 132 and a side surface 134. The top surface 130 is a light-emitting surface, the bottom surface 132 is a light-scattering surface and the side surface 134 is a light-incident surface.

The side light source 124 is a cold cathode fluorescent lamp (CCFL) positioned next to the side surface 134 of the light-guiding plate 122. Light from the side light source 124 enters the light-guiding plate 122 through the light-incident surface 134. After scattering and reflection at the light-diffusion surface 132, the light travels to the light-emitting surface 130. In other words, the light-emitting surface 134 provides a surface light source for illuminating the liquid crystal panel 110.

The reflective holder 126 is positioned next to the light-incident surface 134 of the light-guiding plate 122 and the side light source 124 is enclosed within the reflective holder 126. Light from the side light source 124 is collected upon the side surface 134 of the light-guiding plate 122 after traveling to the reflective holder 126. The frame 128 supports the light-guiding plate 122, the side light source 124 and the reflective holder 126 so that the light-guiding plate 122, the side light source 124 and the reflective holder 126 together form an integrative unit.

Since the liquid crystal molecules will not emit any light by themselves, the back light module 120 must be used to provide a surface light source for illuminating the liquid crystal panel 110 to a sufficiently high level of brightness and contrast.

At present, liquid crystal displays have progressed from the XGA type to ones having a higher level of resolution. Because a higher level of resolution is now limited by the aperature of liquid crystal panel, resolution can be increased only through an increase in the brightness level. In general, the brightness level of a liquid crystal display can be enhanced through an increase in the brightness of the side light source. However, most back light modules using a cold cathode fluorescent lamp to serve as the side light source have limited capacity for brightness increase through an increase in the tube current. Moreover, increasing the tube current not only increases overall power consumption, but also leads to the shortening of the working life of the lamp inside the back light module.

Aside from boosting up the lamp current, other method of increasing the brightness level of the liquid crystal display includes increasing the number of lamps in the back light module. However, increasing the number of lamps not only increases the power consumption, but also increases the overall weight and thickness of the back light module. In other words, the back light module can no longer be streamlined when the additional lamps are incorporated. Moreover, the inverter for driving the back light module must be re-designed as the number of lamps is increased and effort to protect electrical devices against electromagnetic interference must be multiplied.

SUMMARY OF INVENTION

Accordingly, one object of the present invention is to provide a back light module having a bottom light source in addition to a side light source such that overall brightness level provided by the back light module is increased and the possible range of brightness level adjustment is wider.

A second object of this invention is to provide a back light module having a bottom light source in addition to a side light source such that overall working life of the back light module is increased.

A third object of this invention is to provide a brightly-illuminated, high-resolution liquid crystal display with a miniaturized body.

To achieve these and other advantages and in accordance with the purpose of the invention, as embodied and broadly described herein, the invention provides a back light module for providing a surface light source. The back light module comprises a light-guiding plate, a side light source and a bottom light source. The light-guiding plate has a top surface, a bottom surface and at least a side surface. The side light source is positioned next to one side surface of the light-guiding plate. Light from the side light source is able to travel into the light-guiding plate through the side surface. After deflection from the bottom surface, the light travels on to emerge from the top surface of the light-guiding plate. The bottom source light is attached to the bottom surface of the light-guiding plate. The light emitted from the bottom light source is able to enter the bottom surface of the light-guiding panel and emerge from the top surface of the light-guiding plate.

This invention also provides a liquid crystal display that comprises a liquid crystal display panel and a back light module. The back light module comprises a light-guiding plate, a side light source and a bottom light source. The light-guiding plate has a top surface, a bottom surface and at least a side surface. The side light source is positioned next to one side surface of the light-guiding plate. Light from the side light source is able to travel into the light-guiding plate through the side surface. After deflection from the bottom surface, the light travels on to emerge from the top surface of the light-guiding plate. The bottom source light is attached to the bottom surface of the light-guiding plate. The light emitted from the bottom light source is able to enter the bottom surface of the light-guiding panel and emerge from the top surface of the light-guiding plate.

According to one embodiment of this invention, the light-guiding plate is a wedge-shaped plate with a series of steps or a plurality of recess points formed on the bottom surface. The steps or recess points on the bottom surface of the light-guiding plate serve to scatter the light from the side light source. In addition, the side light source can be a cold cathode fluorescent lamp.

According to one embodiment of this invention, the bottom light source can be an organic electroluminescence device. The organic electroluminescence device comprises a transparent substrate, an anode, an organic functional layer and a cathode. The anode is formed on the transparent substrate, the organic functional layer is formed over the anode layer and the cathode is formed over the organic functional layer.

The organic functional layer is a composite stack that includes a hole injection layer, a hole transmission layer, an organic light-emitting layer and an electron transmission layer. The hole injection layer is formed over the anode, the hole transmission layer is formed over the hole injection layer, the organic light-emitting layer is formed over the hole transmission layer and the electron transmission layer is formed between the organic light-emitting layer and the cathode.

In addition, the organic electroluminescence device is formed directly over the transparent substrate. However, the electroluminescence device of this invention can also be formed directly on the bottom surface of the light-guiding plate. When the electroluminescence devices is formed on the bottom surface of the light-guiding plate, a planar layer is formed over the light-guiding plate so that a plane surface is provided for forming various constituent film layers of the organic electroluminescence device.

To enhance the brightness level of the back light module and hence the display capacity of the liquid crystal display, a diffusion plate and a light enhancing plate can be attached to the light-emitting surface of the light-guiding plate. Alternatively, a reflective holder is positioned on one side of the side light source so that the side light source is enclosed.

Furthermore, the light-guiding plate, the side light source, the bottom light source and the reflective holder are assembled together into an integrative back light module using a supporting frame.

According to the embodiment of this invention, the liquid crystal display is a transmissive display panel or a transflective liquid crystal display panel.

In brief, an additional bottom light source is set up on the bottom surface of the light-guiding plate in this invention. Hence, the bottom light source together with the standard side light source is able to increase the brightness level of the illuminating surface light and extend the working life of the back light module. In other words, the back light module design is able not only to increase the brightness level and resolution of the liquid crystal display, but also to reduce the size and weight of the liquid crystal display.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
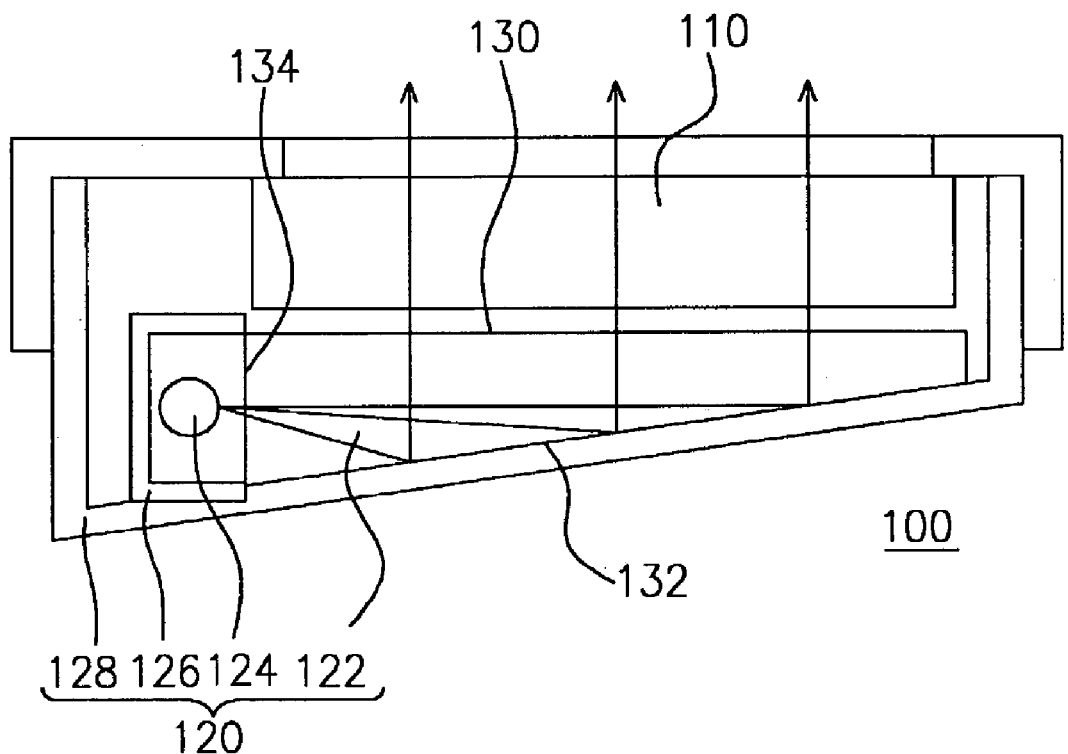
FIG. 1 is a schematic cross-sectional view of a conventional liquid crystal display.

Reference will now be made in detail to the present preferred embodiments of the invention, examples of which are illustrated in the accompanying drawings. Wherever possible, the same reference numbers are used in the drawings and the description to refer to the same or like parts.

Figure 2:
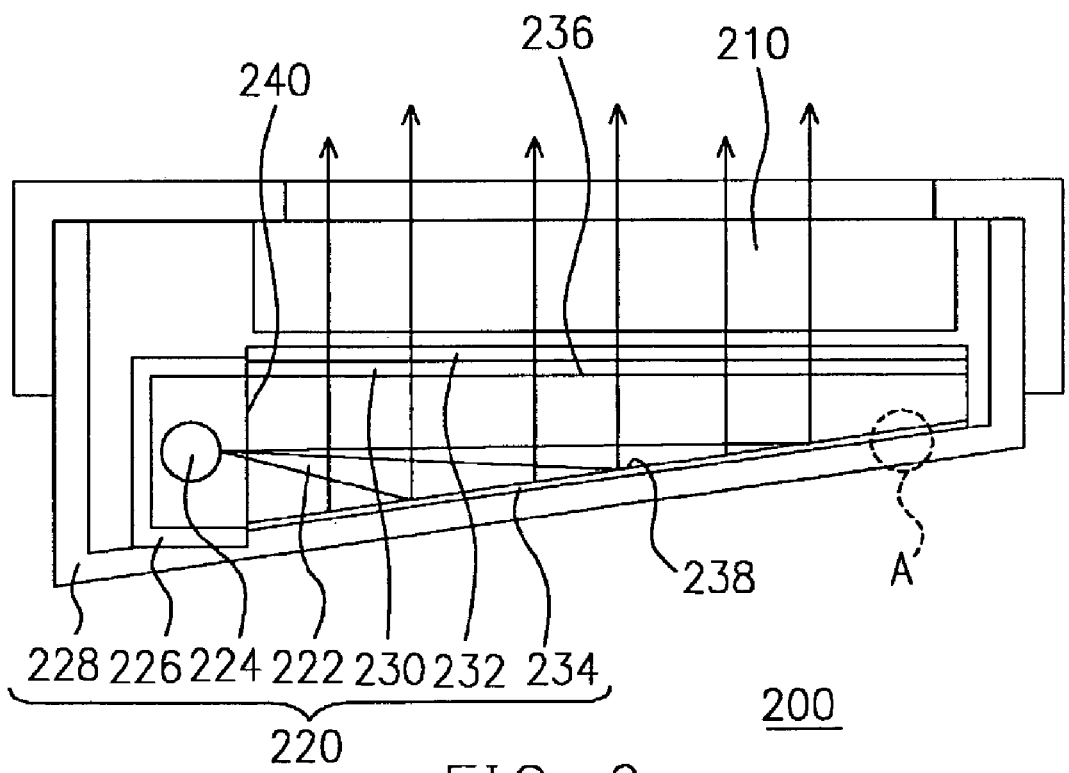
FIG. 2 is a schematic cross-sectional view of a liquid crystal display according to one preferred embodiment of this invention.

FIG. 2 is a schematic cross-sectional view of a liquid crystal display according to one preferred embodiment of this invention. As shown in FIG. 2, the liquid crystal display 200 mainly comprises a liquid crystal panel 210 and a back light module 220. The liquid crystal panel 210 can be a transmissive or transflective liquid crystal panel, for example. The back light module 220 is attached to the back surface (relative to the user) of the liquid crystal panel 210. The back light module furthermore comprises a light-guiding plate 222, a side light source a reflective holder 226, a support frame 228, a diffusion plate 230, a brightness enhancing plate 232 and a bottom light source 234.

Figure 3:
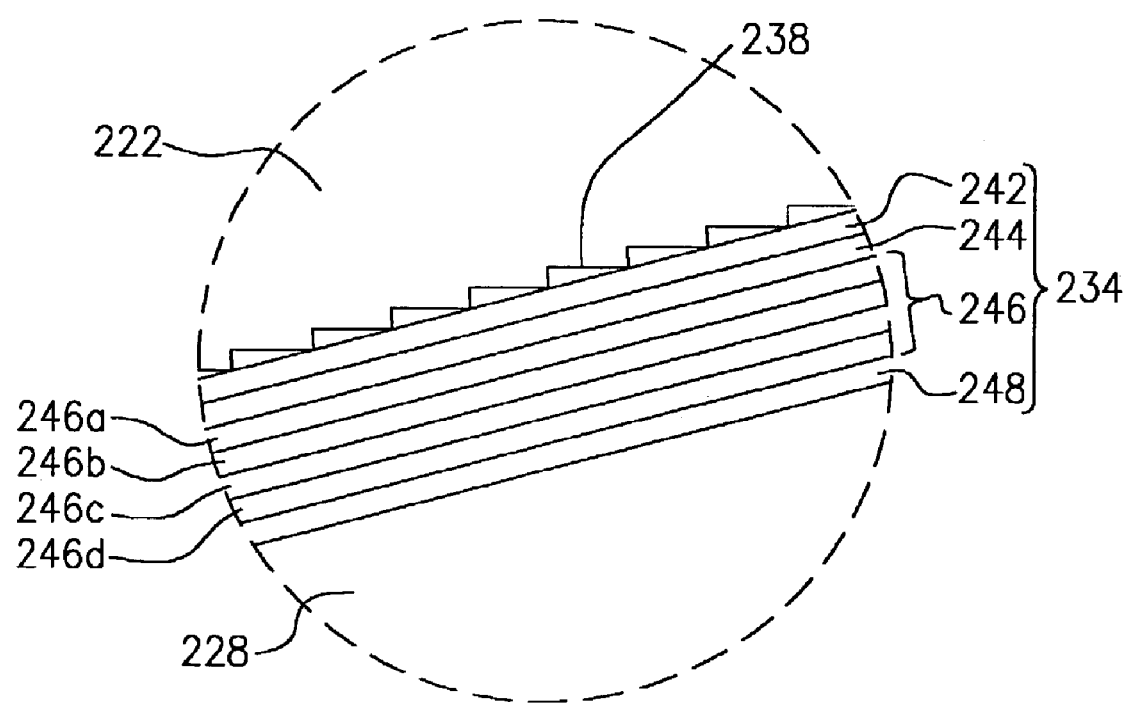
FIG. 3 is a magnified view of the enclosed area A in FIG. 2 showing the surface structure of the bottom light source.

The light-guiding plate 222 is a wedge-shaped panel with a top surface 236, a bottom surface 238 and a side surface 240. The top surface 236 is a light-emitting surface, the bottom surface 238 is a light-scattering surface and the side surface 240 is a light-incident surface. In addition, a series of steps (as shown in FIG. 3) or a plurality of recess points is etched on the bottom surface 238 for scattering the light from the side light source 224.

The side light source 224 is a cold cathode fluorescent lamp (CCFL) positioned next to the side surface 240 of the light-guiding plate 222.

Light from the side light source 224 enters the light-guiding plate 222 through the light-incident surface 240. After scattering and reflection at the light-scattering surface 238, the light emerges from the top surface 236. In other words, the top surface 236 provides a surface light source for illuminating the liquid crystal panel 210.

The reflective holder 226 is positioned next to the side surface 240 of the light-guiding plate 222 and the side light source 224 is enclosed within the reflective holder 226. Light from the side light source 224 is focused upon the side surface 240 of the light-guiding plate 222 after traveling to the reflective holder 226. The diffusion plate 230 is set up on the top surface 236 of the light-guiding plate 222 and the brightness enhancing plate 232 is set up over the diffusion plate 230. Through the reflective holder 226, the diffusion plate 230 and the brightness enhancing plate 232, brightness level provided by the back light module 200 is increased and the displaying capacity of the liquid crystal display is improved. The frame 228 supports the light-guiding plate 222, the side light source 224, the bottom light source 234 and the reflective holder 226 so that the light-guiding plate 222, the side light source 224, the bottom light source 234 and the reflective holder 226 together form an integrative unit.

FIG. 3 is a magnified view of the enclosed area A in FIG. 2 showing the surface structure of the bottom light source.

As shown in FIG. 3, the bottom light source 234 is an electroluminescence device comprising a transparent substrate 242, an anode 244, an organic functional layer 246 and a cathode 248. The transparent substrate 242 is disposed over the bottom surface 238 of the light-guiding plate 222. The anode 244 is formed over the transparent substrate 242. The organic functional layer 246 is formed over the anode 244. The cathode 248 is formed over the organic functional layer 246.

In addition, the organic functional layer is a composite layer comprising a hole injection layer 246a, a hole transmission layer 246b, an organic light-emitting layer 246c and an electron transmission layer 246d. The hole injection layer 246a is formed over the anode 244. The hole transmission layer 246b is formed over the hole injection layer 246a. The organic light-emitting layer 246c is formed over the hole transmission layer 246b. The electron transmission layer 246d is formed between the organic light-emitting layer 246c and the cathode 248.

In another embodiment of this invention, the organic electroluminescence device may form directly over the bottom surface of the light-guiding plate 222. The method includes forming a planar layer (not shown) over the bottom surface 238 of the light-guiding plate 222 before sequentially forming various film layers of the organic luminescence device over the planar layer.

As shown in FIGS. 2 and 3, the bottom light source 234 emits light when a driving current is supplied. Light from the bottom light source enters the light-guiding plate 222 through the bottom surface 238 and emerges from the light-guiding plate 222 through the top surface 236. The light emerging from the top surface 236 from the bottom light source 234 is also a planar light source. To illuminate the liquid crystal display 200, both the side light source 224 and the bottom light source 234 can be driven. Through the summation of light from both light sources, the liquid crystal panel 210 receives a surface light source sufficient brightness level to enhance the display ability. Obviously, when the required brightness level is only moderate, either one of the light sources 224 or 234 may be used to extend the overall working life of the back light module 200.

In summary, the back light module and liquid crystal display according to this invention has at least the following advantages: 1. The bottom light source and the side light source together not only provide a brighter surface light source, but also provide an increase in the range of adjustment on the brightness level. Hence, the liquid crystal display has a brighter screen and a better resolution. 2. The side light source and the bottom light source inside the back light module can be used together or individually to extend overall working life. 3. Since the bottom light source is attached to the bottom surface of the light-guiding plate, overall thickness of the back light module is increased just a little. Therefore, the ultimately assembled liquid crystal display still has a slim body.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A back light module for providing a plane light source, at least comprising:
   a light-guiding plate having a top surface, a bottom surface and at least a side surface;
   a side light source positioned next to one side surface of the light-guiding plate, wherein light from the side light source is able to enter the side surface of the light-guiding plate and emerges from the top surface after deflection by the bottom surface;
   a bottom light source attached to the bottom surface of the light-guiding plate, wherein light from the bottom light source is able to enter the bottom surface of the light-guiding plate and emerge from the top surface of the light-guiding plate; and
   a reflective holder positioned next to the side surface of the light-guiding plate that also encloses the side light source.

2. The back light module of claim 1, wherein the light-guiding plate comprises a wedge-shaped plate.

3. The back light module of claim 1, wherein the bottom surface has a staircase-like profile or a plurality of recess points etched thereon for scattering the light from the side light source.

4. The back light module of claim 1, wherein the bottom light source comprises an organic electroluminescence device.

5. The back light module of claim 4, wherein the electroluminescence device furthermore comprises:
   a transparent substrate;
   an anode formed over the transparent substrate;
   an organic functional layer formed over the anode; and
   a cathode formed over the organic functional layer.

6. The back light module of claim 5, wherein the organic functional layer furthermore comprises:
   a hole injection layer formed over the anode;
   a hole transmission layer over the hole injection layer,
   an organic light-emitting layer formed over the hole transmission layer; and
   an electron transmission layer formed between the organic light-emitting layer and the cathode.

7. The back light module of claim 4, wherein the electroluminescence device furthermore comprises:
   a planar layer formed over the bottom surface of the light-guiding plate;
   an anode over the planar layer;
   an organic functional layer over the anode; and
   a cathode over the organic functional layer.

8. The back light module of claim 7, wherein the organic functional layer furthermore comprises:
   a hole injection layer formed over the anode;
   a hole transmission layer over the hole injection layer;
   an organic light-emitting layer formed over the hole transmission layer; and
   an electron transmission layer formed between the organic light-emitting layer and the cathode.

9. A liquid crystal display, comprising:
   a liquid crystal display panel;
   a back light module for providing a plane light source, comprising:
      a light-guiding plate having a top surface, a bottom surface and at least a side surface;
      a side light source positioned next to one side surface of the light-guiding plate, wherein light from the side light source is able to enter the side surface of the light-guiding plate and emerges from the top surface after deflection by the bottom surface;
      a bottom light source attached to the bottom surface of the light-guiding plate, wherein light from the bottom light source is able to enter the bottom surface of the light-guiding plate and emerge from the top surface of the light-guiding plate; and a reflective holder positioned next to the side surface of the light-guiding plate that also encloses the side light source.

10. The liquid crystal display of claim 9, wherein the light-guiding plate comprises a wedge-shaped plate.

11. The liquid crystal display of claim 9, wherein the bottom surface has a staircase-like profile or a plurality of recess points etched thereon for scattering the light from the side light source.

12. The liquid crystal display of claim 9, wherein the bottom light source comprises an organic electroluminescence device.

13. The liquid crystal display of claim 12, wherein the electroluminescence device furthermore comprises:
   a transparent substrate;
   an anode formed over the transparent substrate;
   an organic functional layer formed over the anode; and
   a cathode formed over the organic functional layer.

14. The liquid crystal display of claim 13, wherein the organic functional layer furthermore comprises:
   a hole injection layer formed over the anode;
   a hole transmission layer over the hole injection layer;
   an organic light-emitting layer formed over the hole transmission layer; and
   an electron transmission layer formed between the organic light-emitting layer and the cathode.

15. The liquid crystal display of claim 12, wherein the electroluminescence device furthermore comprises:
   a planar layer formed over the bottom surface of the light-guiding plate;
   an anode aver the planar layer;
   an organic functional layer over the anode; and
   a cathode over the organic functional layer.

16. The liquid crystal display of claim 15, wherein the organic functional layer furthermore comprises:
   a hole injection layer formed over the anode;
   a hole transmission layer over the hole injection layer;
   an organic light-emitting layer formed over the hole transmission layer; and
   an electron transmission layer formed between the organic light-emitting layer and the cathode.

17. A back light module for providing a plane light source, at least comprising:
   a wedge-shaped light-guiding plate having a top surface, a bottom surface and at least a side surface;
   a side light source positioned next to one side surface of the wedge-shaped light-guiding plate, wherein light from the side light source is able to enter the side surface of the wedge-shaped light-guiding plate and emerges from the top surface after deflection by the bottom surface; and
   a bottom light source attached to the bottom surface of the wedge-shaped light-guiding plate, wherein light from the bottom light source is able to enter the bottom surface of the wedge-shaped light-guiding plate and emerge from the top surface of the light-guiding plate.

18. The back light module of claim 17, wherein the bottom surface has a staircase-like profile or a plurality of recess points etched thereon for scattering the light from the side light source.

* * * * *